(12) United States Patent
Jensen et al.

(10) Patent No.: US 11,343,377 B1
(45) Date of Patent: May 24, 2022

(54) VIRTUAL ASSISTANT INTERFACE FOR CALL ROUTING

(71) Applicant: United Services Automobile Association (USAA), San Antonio, TX (US)

(72) Inventors: Philip Ryan Jensen, San Antonio, TX (US); Everett Russell Freeman James, San Antonio, TX (US); James Shamlin, San Antonio, TX (US); Sheryl Lane Niemann, San Antonio, TX (US); Shanna Limas, San Antonio, TX (US); Samir Hojat, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 72 days.

(21) Appl. No.: 16/251,683

(22) Filed: Jan. 18, 2019

Related U.S. Application Data

(60) Provisional application No. 62/618,932, filed on Jan. 18, 2018.

(51) Int. Cl.
| | |
|---|---|
| *H04M 3/493* | (2006.01) |
| *G10L 15/08* | (2006.01) |
| *G06N 20/00* | (2019.01) |
| *H04M 3/523* | (2006.01) |
| *H04M 3/51* | (2006.01) |

(52) U.S. Cl.
CPC .......... *H04M 3/4936* (2013.01); *G06N 20/00* (2019.01); *G10L 15/08* (2013.01); *H04M 3/5183* (2013.01); *H04M 3/5233* (2013.01); *G10L 2015/088* (2013.01)

(58) Field of Classification Search
CPC ............ H04M 3/4936; H04M 3/5183; H04M 3/5233; G06N 20/00; G10L 15/08; G10L 2015/088
USPC ........................................................ 704/232
See application file for complete search history.

(56) References Cited

U.S. PATENT DOCUMENTS

| | | | | |
|---|---|---|---|---|
| 8,605,885 B1* | 12/2013 | Woofers | .................. | H04M 3/51 379/265.02 |
| 9,760,892 B2* | 9/2017 | Bourguignon | ......... | G06Q 30/02 |
| 10,540,967 B2* | 1/2020 | Perez | ...................... | G10L 15/22 |
| 2006/0159240 A1* | 7/2006 | Bushey | ............... | G10L 15/1815 379/88.14 |

(Continued)

*Primary Examiner* — Pierre Louis Desir
*Assistant Examiner* — Nicole A K Schmieder
(74) *Attorney, Agent, or Firm* — Fish & Richardson P.C.

(57) ABSTRACT

Methods, systems, and apparatus, including computer programs encoded on computer storage media, for determining a transfer option for transferring a call. One of the methods include receiving, by a call assistant engine, a keyword related to information provided by a user to an agent during a call; generating, by the call assistant engine, follow-up questions to be displayed on a user device of the agent in an interactive format, the first follow-up question being generated based on the keyword, each of the following follow-up questions being generated based on an answer of the agent to the previous question; and determining, by the call assistant engine, based on answers of the agent to the follow-up questions, a transfer option for transferring the call.

21 Claims, 9 Drawing Sheets

(56) References Cited

U.S. PATENT DOCUMENTS

| | | | |
|---|---|---|---|
| 2010/0076843 A1* | 3/2010 | Ashton | G06Q 30/0253 |
| | | | 705/14.51 |
| 2014/0140497 A1* | 5/2014 | Ripa | H04M 3/5133 |
| | | | 379/265.06 |
| 2015/0213800 A1* | 7/2015 | Krishnan | G10L 25/63 |
| | | | 704/246 |
| 2015/0248270 A1* | 9/2015 | Lang | G06F 3/0482 |
| | | | 704/258 |
| 2018/0007206 A1* | 1/2018 | Klein | H04L 12/1827 |
| 2018/0338040 A1* | 11/2018 | Carty | G06F 40/242 |
| 2018/0376002 A1* | 12/2018 | Abraham | H04M 3/5166 |
| 2019/0205388 A1* | 7/2019 | Otaki | G06F 40/30 |
| 2020/0042597 A1* | 2/2020 | Wu | G06F 40/30 |

\* cited by examiner

VIRTUAL ASSISTANT INTERFACE FOR CALL ROUTING

CROSS-REFERENCE TO RELATED APPLICATION

This application claims priority to U.S. Provisional Application Ser. No. 62/618,932, filed on Jan. 18, 2018. The disclosure of the prior application is considered part of and is incorporated by reference in the disclosure of this application.

BACKGROUND

Call centers are widely deployed by companies, government agencies, and other organizations to handle incoming telephone calls from customers or users who want to ask questions and/or to request for assistance. To handle such inquiries and requests, call centers are staffed with technical support personnel, customer service personnel, or sales support personnel (hereinafter collectively referred to as agents). Depending on the nature of an inquiry or a request for assistance, an agent may handle the inquiry or request, or may forward the inquiry or request to another agent by transferring the call.

SUMMARY

In general, one innovative aspect of the subject matter described in this specification can be embodied in methods that include receiving, by a call assistant engine, a keyword related to information provided by a user to an agent during a call; generating, by the call assistant engine, follow-up questions to be displayed on a user device of the agent in an interactive format, the first follow-up question being generated based on the keyword, each of the following follow-up questions being generated based on an answer of the agent to the previous question; and determining, by the call assistant engine, based on answers of the agent to the follow-up questions, a transfer option for transferring the call.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Receiving the keyword may include receiving the keyword from a speech recognition subsystem configured to extract keywords from the information provided by the user to the agent during the call. The speech recognition subsystem may be configured to extract keywords using a machine learning model. Receiving the keyword may include receiving the keyword from the user device of the agent. Generating the follow-up questions may include sequentially displaying the follow-up questions on a user interface of the user device. Each of the follow-up questions may be displayed on the user interface of the user device in response to an answer by the agent to a question preceding the follow up question. The agent may be employed by an organization and the transfer option may identify a department at the organization where the call should be transferred to. The methods may further include displaying, on a user interface of the user device, a plurality of sub-options for transferring the call to the identified department, the plurality of sub-options including a cold transfer sub-option and a warm transfer sub-option. The plurality of sub-options may include a sub-option to view a Vector Directory Number associated with the identified department.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
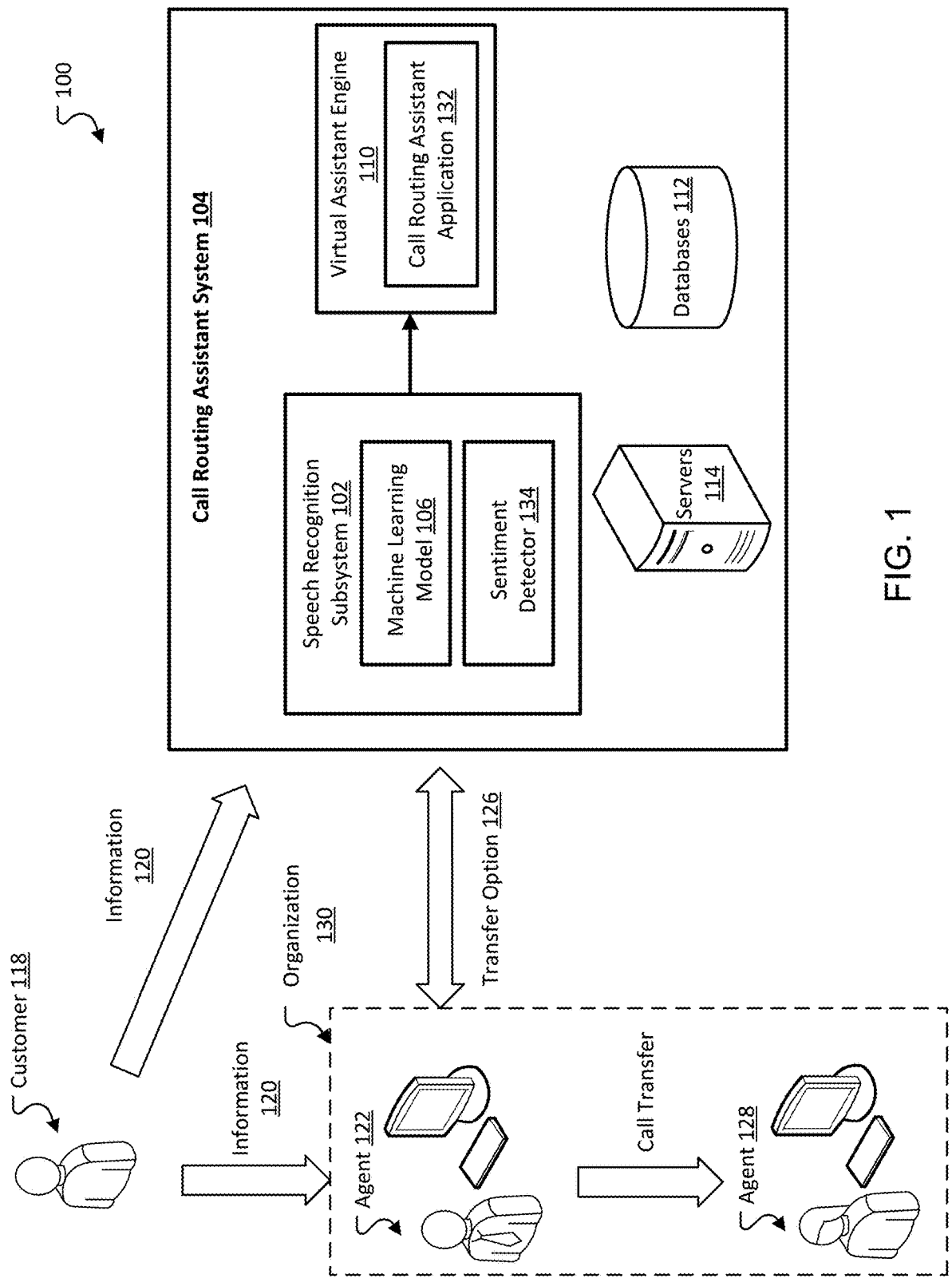
FIG. 1 illustrates an example of an environment for determining a transfer option for transferring a call.

Call centers are widely deployed by companies, government agencies, and other organizations to handle incoming telephone calls from customers or users who want to ask questions and/or to request for assistance. To handle such inquiries and requests, call centers are staffed with technical support personnel, customer service personnel, or sales support personnel (hereinafter collectively referred to as agents). Depending on the nature of an inquiry or a request for assistance, an agent may handle the inquiry or request by himself, or may forward the inquiry or request to another agent by transferring the call. As an organization may have a large number of departments and units, each with its own specialty, determining where a call should be transferred to can be a difficult and time-consuming task.

In particular, to determine where a customer call should be transferred to, an agent of an organization may use a search tool to search for a proper unit at a proper department that can handle the call. Using conventional search tools are inefficient and tedious, as these tools often rely on the agent's experience and understanding of the business and the structure of the organization to provide necessary information. For example, in order to narrow down search results, the agent may need to enter several exact keywords and/or to select multiple values from a series of drop-down lists. If the organization has a large, complex structure with many different departments and units, each with its own specialty, the agent may not know keywords that lead to a correct unit at a correct department, or the agent may not know which values should be selected from the drop-down lists. In addition, during the time the agent spends searching for the correct department, the agent may not be paying attention to what the customer is talking and may misunderstand the customer's question or request. Inaccurate searches and misunderstood customer requests may result in incorrect transfers to wrong departments. Further, searching using keywords and drop-down lists may take long time, e.g., up to five minutes or more if the agent is unfamiliar with the area. The time-consuming and inefficient search process wastes customer time, causes lost calls and call hang-ups due to incorrect transfers, and reduces customer satisfaction.

This specification describes systems and methods that assist agents to quickly and accurately route telephone calls to correct departments and units. By incorporating a speech recognition subsystem that automatically listens to conversations between agents and customers and extracts keywords from the conversations, and a virtual assistant tool that prompts the agents for information in an interactive format (e.g., a chat-like format), the systems and methods described herein provides improvements over existing systems as it results in faster and more accurate search results while not relying on the agents' experience and knowledge about the organization's structure and business. The systems therefore provide significant benefits for the organization, including reduced time spent for agent, reduced customer waiting time, and reduced number of incorrect call transfers. The systems further improve customer satisfaction as customer inquiries and requests are quickly handled by agents with matching expertise. These benefits can lead to higher revenues, e.g., by eliminating revenue losses that come from lost calls or call hang-ups due to incorrect transfers and by maximizing conversion rates by ensuring that callers have better overall customer experiences.

FIG. 1 illustrates an example of an environment 100 for determining a transfer option for transferring a call. The environment includes a call routing assistant system 104. The call routing assistant system 104 includes a server system 114 and databases 112. The call routing assistant system 104 further includes a speech recognition subsystem 102 and a virtual assistant engine 110. The server system 114 may include one or more servers coupled to the Internet or other computer network. The databases 112, the speech recognition subsystem 102, and the virtual assistant engine 110 may reside at the server system 114. The server system 114 may be located at an organization or be distributed across the Internet or other computer network. The databases 112 stores data/information about customers or users of the organization, and products or services that have been obtained by the customers or users. For example, the organization can be a financial institution that offers loan and insurance products, e.g., auto loans; car insurance, home insurance, and life insurance products. The databases 112 can store, for each customer, detailed information about each of the products and/or services (e.g., contract terms, transaction history, recent activities, and payments) associated with the customer. The databases 112 may also store historical data/information about communications between customers and the financial institution, for example, inquiry emails from the customers and responses by the financial institution to the customers. The databases 112 may store recorded calls between customers and agents of the financial institution and/or a written summary of the content of the calls. In addition, the databases 112 may also store search queries including keywords that have been entered by agents in order to search for information inquired by the customers.

As shown in FIG. 1, in this example, a customer 118 calls an organization 130 to request for assistance or to ask questions regarding a product or service that the customer 118 has obtained from the organization 130. The customer 118 may call a customer service number that directs the call to a call center of the organization 130. An agent 122 at the call center answers the call. The customer 118 provides the agent 122 with information 120 that includes a description of the customer's situation and questions that the customer 118 has. For example, the organization 130 may be a financial institution, e.g., a bank that offers loan and an insurance company that offers insurance products. The customer 118 has purchased an auto insurance from the financial institution. The customer has just been involved in a car accident that resulted in car damage and personal injuries. The customer 118 is calling to report the car accident and to ask about the process for filing a new claim. The agent 122 may have specialty in products other than auto insurance products and thus the agent 122 needs to transfer the call to an appropriate department/unit specializing in auto insurance, or more specifically, auto insurance with personal injury protection. While listening to the customer 118, the agent 122 can use the call routing assistant system 104 to search for the appropriate department/unit that can provide the customer 118 with the assistance and/or answer the questions of the customer 118.

The call routing assistant system 104 includes the virtual assistant engine 110 with which the agent 122 can interact during the searching process. The virtual assistant engine 110 can generate a call routing assistant application 132 (e.g., a web application or a mobile application) or a website that enables the agent 122 to quickly determine the correct department/unit. Example screenshots of the application 132 (or the website) for the agent 122 to determine the correct department/unit are illustrated in FIGS. 2A-2F. The agent 122 can use a computing device such as a desktop, a laptop, a mobile device, or any computing device to access the application 132 or the website.

The call routing assistant system 104 further includes the speech recognition subsystem 102 that can assist the agent 122 to capture the information 120 provided by the customer 118 during the call. While the agent 122 is searching for an appropriate department where the call should be routed to, the agent 122 may not be paying attention to the customer 118 on the phone and may miss details of the conversation. In some cases, the agent 122 may miss the details of the conversation for other reasons such as the customer 118 is speaking too fast. The speech recognition subsystem 102 can act as an additional listener that helps the agent 122 to capture details of the conversation including the missing details.

Generally, the speech recognition subsystem 102 may include a machine learning model 106 that is configured to receive sequences of speech of the customer 118 and to extract important keywords from the sequences of speech. For example, the machine learning model 106 may be a neural network that employs one or more neural network layers (e.g., layers of nonlinear units) to predict an output for a received input. For instance, if the input to the neural network is a sequence representing a spoken utterance of the customer 118, the output generated by the neural network may include machine readable text that includes keywords extracted from the sequence. In the above car accident example, the speech recognition subsystem 102 may extract keywords such as "auto insurance," "car," "accident," "serious," "damage," "personal injuries," and "claim" from the information 120 provided by the customer 118. In some implementations, the speech recognition subsystem 102 may include a sentiment detector 134 that is configured to monitor sentiments of the customer 118 throughout the conversation and to alert the agent 122 if the system 102 detects negative sentiments (e.g., impatient, upset, or angry). If negative sentiments are detected, the agent needs to pay closer attention to what the customer is talking about rather than continuing searching for call transfer options.

To search for an appropriate department that the call should be routed to, in some implementations, the agent 122 can first enter one or more search terms into the call routing assistant application 132 provided by the virtual assistant engine 110. For example, the agent 122 can enter the term "claim" and/or "auto insurance."

In some other implementations, the virtual assistant engine 110 can automatically receive, from the speech recognition subsystem 102, one or more keywords extracted by the system 102 as search terms. For example, the virtual assistant engine 110 can receive from the speech recognition subsystem 102 keywords such as "claim" and/or "auto insurance."

The virtual assistant engine 110 then processes the initial search term/keyword to predict what the agent 122 is looking for and to determine appropriate questions to ask the agent 122 in order to obtain complete and accurate information needed for refining search results into one final result. The application 132 then presents to the agent 122 one or more follow-up questions in an interactive format (e.g., a chat-like format). Each of the follow-up questions is asked as a result of the agent 122 answering the previous question. In some cases, the application 132 may present several alternative answer choices to each follow-up question and the agent 122 can simply answer the question by selecting one of the answer choices. In some other cases, the agent 122 may type in an answer, which generally includes one word or a few words. After the agent 122 answers a question, the application 132 can refine the search results and ask a next question to further refine the results, until all questions are asked and only one search result is obtained.

In particular, the virtual assistant engine 110 maintains possible question trees, each question tree including a series of questions. For each series of questions, the engine 110 maintains associated answers pre-configured to help the engine 110 determine which relevant questions should be displayed on the application 132 to ask the agent 122 next. For example, the engine 110 is configured so that when "Claim" is entered by the agent 122 as the initial keyword, the engine 110 asks the agent 122, through the application 132, "What type of claim is this?" with options such as "Auto Insurance", "Life Insurance", and "Valuable Personal Property Insurance." This question and associated answers are linked to the keyword "Claim". Once a proper type of claim is selected by the agent 122, the system has a series of keywords to use for populating the next question. For example, the series of keywords "Claim/Auto" could prompt the question "Is this an existing claim?" with answers "Yes" and "No". The answer chosen by the agent 122 results in another addition to the search keyword has now become "Auto/Claim/Yes," which may lead to another question or may result in a transfer option of, for example, "Auto Claims—In-Progress". These possible question trees can be designed and pre-configured based upon possible combinations of different factors such as keywords, answers to questions, and names and functions of departments.

In some implementations, these possible question trees can be designed to follow a hierarchical structure of the organization. Each of the answer provided by the agent allows the engine 110 to move to the next branch of the question tree, which corresponds to a lower level of the organization structure (e.g., a smaller division/unit) that is more relevant to the areas that the customer 118 is interested in).

The initial search terms/keywords entered by agent 122 or extracted by the speech recognition subsystem 102 serve as a contextual information that allows the engine 110 to quickly determine an appropriate question tree that likely leads to a correct routing decision. For example, based on the keywords "claim" and "auto insurance," the engine 110 starts a question tree within the Claim Unit of the Auto Insurance Department of the organization, rather than searching all possible departments and units, which is time-consuming and inefficient.

In some implementation, the possible question trees can be automatically generated using one or more machine learning algorithms to determine the most efficient branches that potentially yield the most accurate search results. More specifically, a machine learning model can be trained to generate a series of questions based on initial search terms/keywords and based on the answer of a customer to each question. The machine learning model can be trained using a supervised or unsupervised machine learning technique.

In some cases, the machine learning model is a parametric model and generates one or more output questions based on one or more input keywords/answers and on values of the parameters of the machine learning model. The machine learning model can be refined over time based on training data collected from interactions between agents and customers. More specifically, the training data can include multiple training examples. In some implementations, each training example includes (i) one or more input search terms/keywords/answers; and (ii) a ground-truth output that includes: one or more output questions that lead to an accurate call routing option, and the accurate call routing option. During training, the parameters of the machine learning model can be adjusted to optimize an objective function that can be computed based on the training data. For example, the parameters of the machine learning model can be adjusted to minimize a loss function that represents a discrepancy between an output of the model and a ground-truth output.

Prior search tools may return thousands of search results for a single search term and may require an agent to simultaneously select values from multiple drop-down lists (e.g., seven to ten of lists and each list may have ten values) to further narrow down the search results. The number of drop-down lists and the number of selectable values from each list can largely increase in accordance with the size and complexity of the structure of an organization, thus requiring the agent to have knowledge about the structure of organization and the functionality of each department/unit in the organization in order to select the correct values that result in the correct department where a call should be routed to. In contrast, the call routing assistant application 132 only needs the agent 122 to answer a few simple questions one after another in order to achieve a single search result that identifies the correct department for the call transfer, thus saving the agent 122's time and the customer's waiting time while producing more accurate search results as it does not rely on the agent 122's own knowledge about the organization 130. The number of questions that the agent 122 needs to answer in order to get a single search result depends on the complexity of the structure/hierarchy of the organization 130 and the specific initial search term/keyword that the agent 122 entered, but in most cases, the agent 122 only needs to answer three to four questions.

After the application 132 has asked all questions and obtained a single search result (e.g., a transfer option 126) that identifying the appropriate department, the application 132 can provide the agent 122 with different transfer sub-options to transfer the call to the identified department. The transfer sub-options can include at least one of a cold transfer sub-option, a warm transfer sub-option, or a sub-option to view a Vector Directory Number (VDN) associated with the department. The agent 122 can select one of the transfer sub-options and transfer the call, using the selected transfer sub-option, to the identified department, where an agent 128 will pick up the call and continue helping the customer 118.

FIGS. 2A-2F illustrate simplified example screenshots of a call routing assistant application or a website that an agent may use to search for an appropriate department/unit that a call should be transferred to. For illustration purposes, the example screenshots show example interactions between an agent (e.g., the agent 122 of FIG. 1) with the call routing assistant application 200. The agent is looking to transfer the call from a customer (e.g., the customer 118 of FIG. 1), who is calling to report a car accident and to request for assistance with filing a new claim.

Figure 2A:
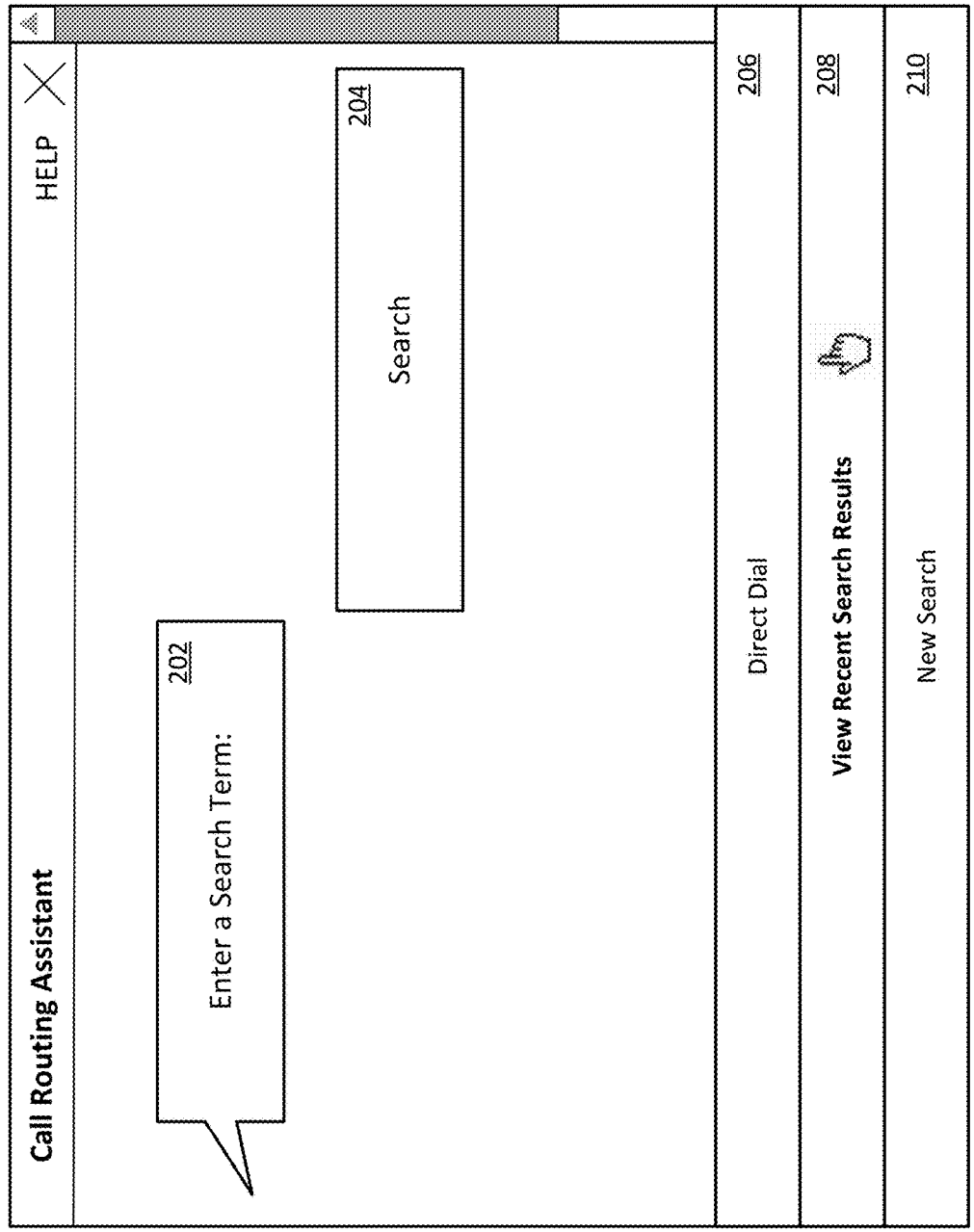
FIGS. 2A-2F illustrate simplified example screenshots of an application or a website for an agent to determine a transfer option.

As shown in FIG. 2A, the application 200 allows the agent to select between Direct Dial option (206), an option to view recent search results (208), or an option to start a new search (210).

If the agent 122 already knows the exact extension that the agent 122 wants to transfer the call to, the agent 122 can select the Direct Dial option (206). The option 206 allows the agent 122 to type in the extension without having to answer questions prompted by the call routing assistant application.

Figure 2B:
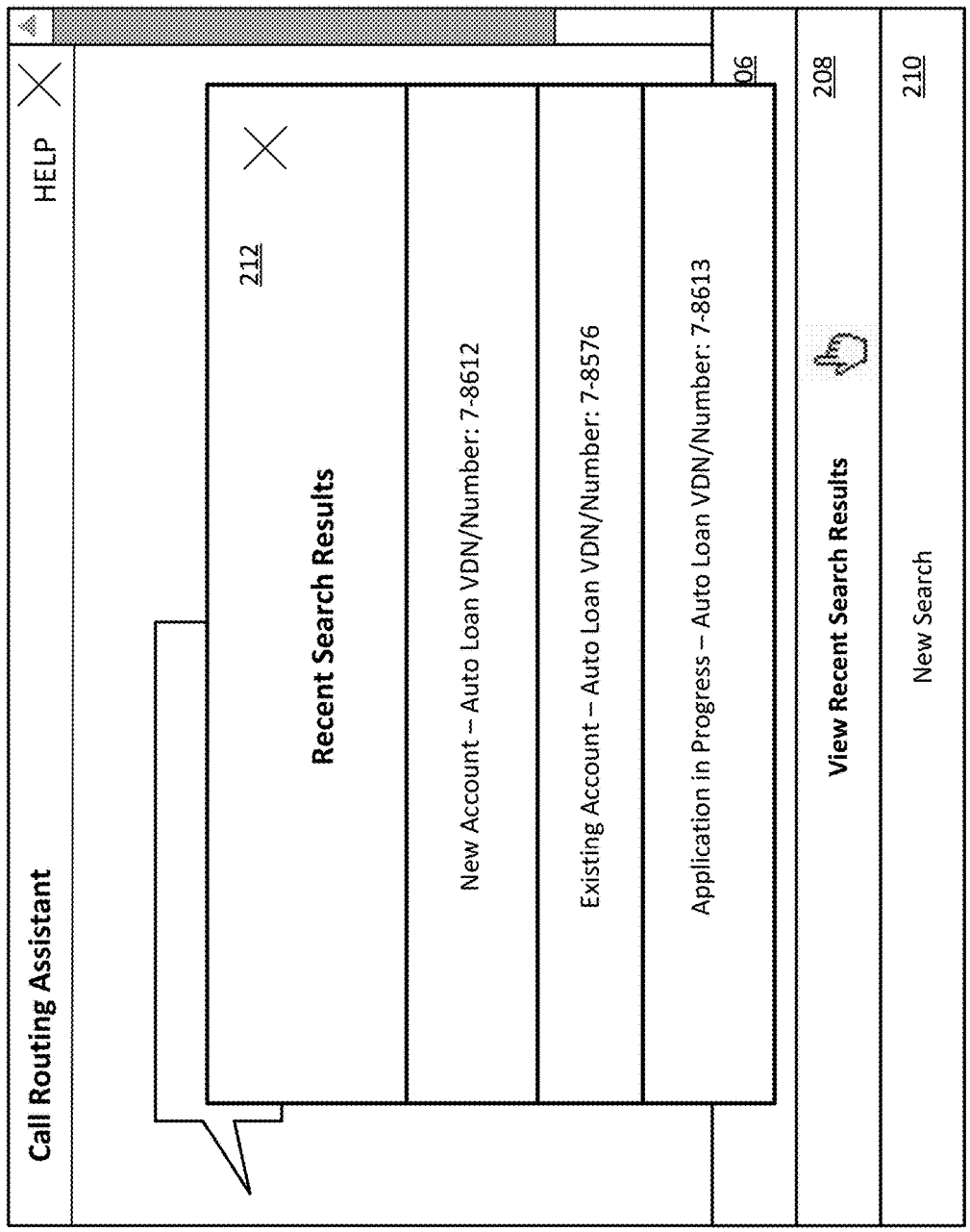

If the agent selects the option 208 to view recent search results, the application 200 can display a list of recent search results 212. For example, as shown in FIG. 2B, the list of recent search results 212 includes different VDN/Numbers that can be used to transfer calls to an Auto Loan department. Each number is associated with a different matter. For example, a call related to opening a new account can be routed to 7-8612, a call related to inquiries about an existing account can be routed to 7-8576, and a call related to an application in progress can be routed to 7-8613.

Figure 2C:
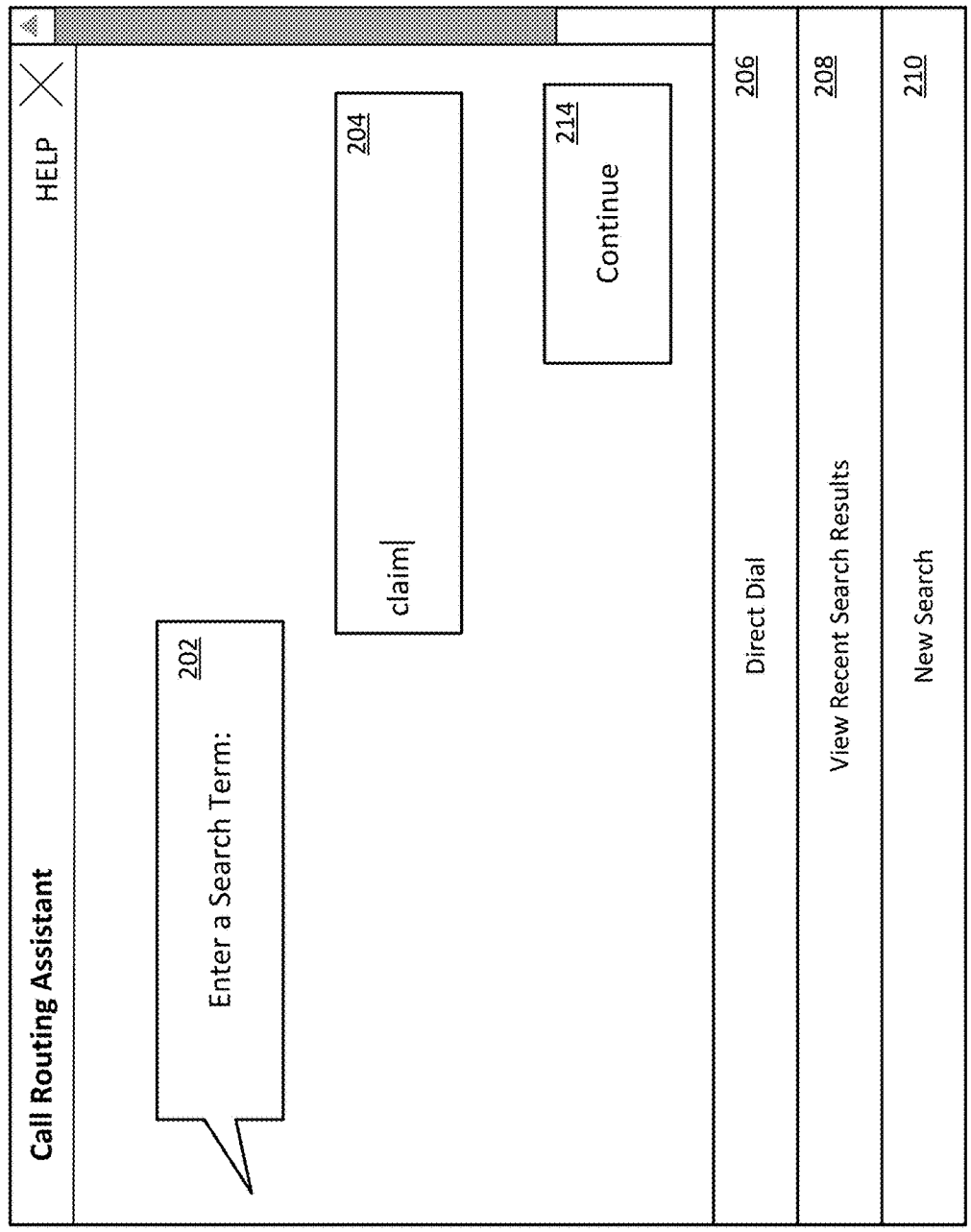
Figure 2D:
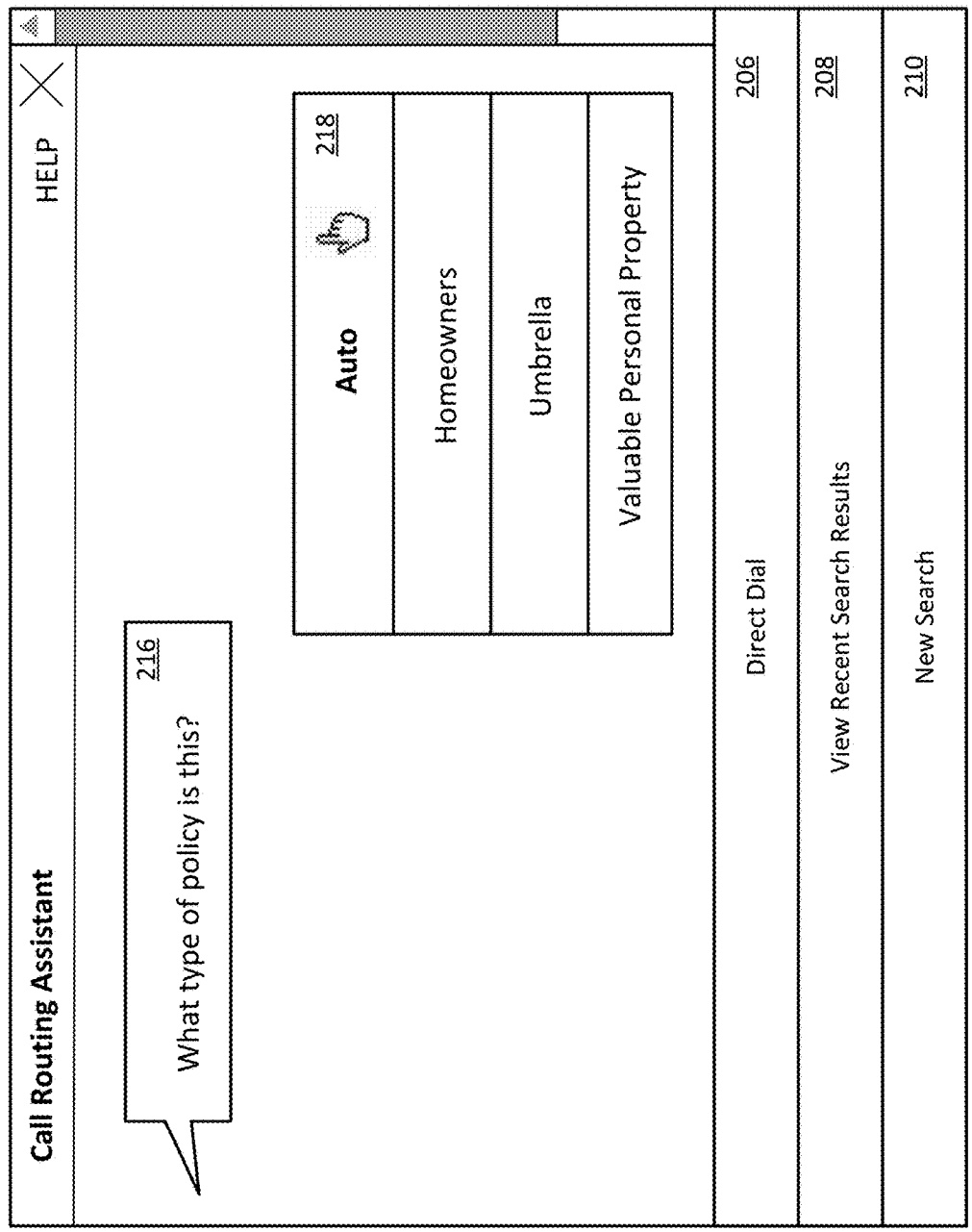
Figure 2E:
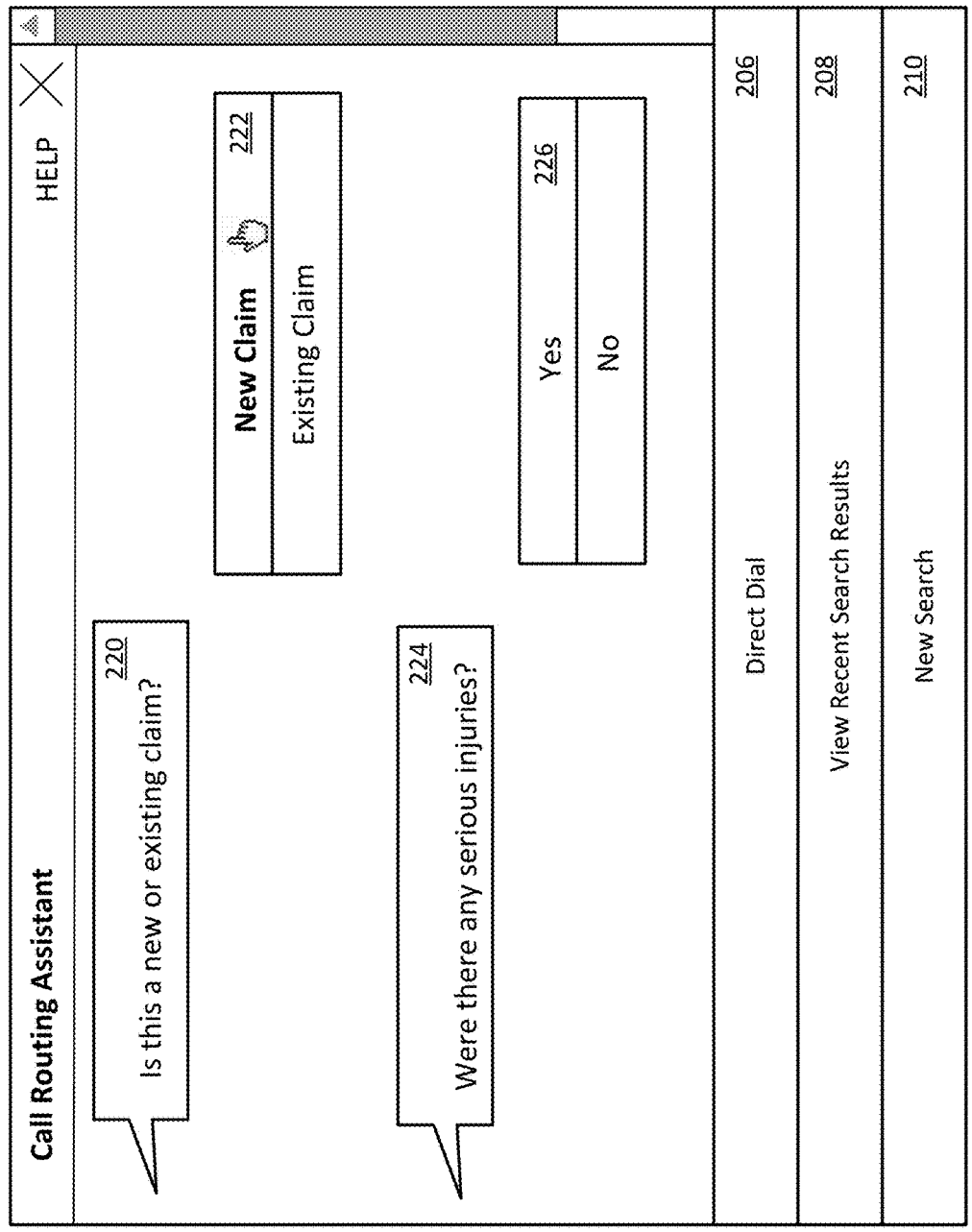

If the agent selects the option 210 to perform a new search, as shown in FIG. 2C, the application 200 can prompt the agent to enter a search term (202). The agent can enter a search term, for example, "claim" (204), and click on the Continue button (214). In response, as shown in FIG. 2D, the application 200 presents to the agent a follow up question 216, for example, "What type of policy is this?". The application 200 can present several options for the agent to choose from, for example, "Auto," "Homeowners," "Umbrella," and "Valuable Personal Property." The agent can select the "Auto" option (218). In response, as shown in FIG. 2E, the application 200 can ask the agent another follow-up question 220, e.g., "Is this a new or existing claim?". The agent can select either a "New claim" option (222) or an "Existing claim" option. Assuming that the agent selects the "New claim" option (222), the application 200 can ask another follow-up questions 224, for example, "Were there any serious injuries?" to further narrow down the search results. The agent can select either "Yes" or "No" to answer the question. Since the customer has serious personal injuries, the agent selects "Yes" (226).

Figure 2F:
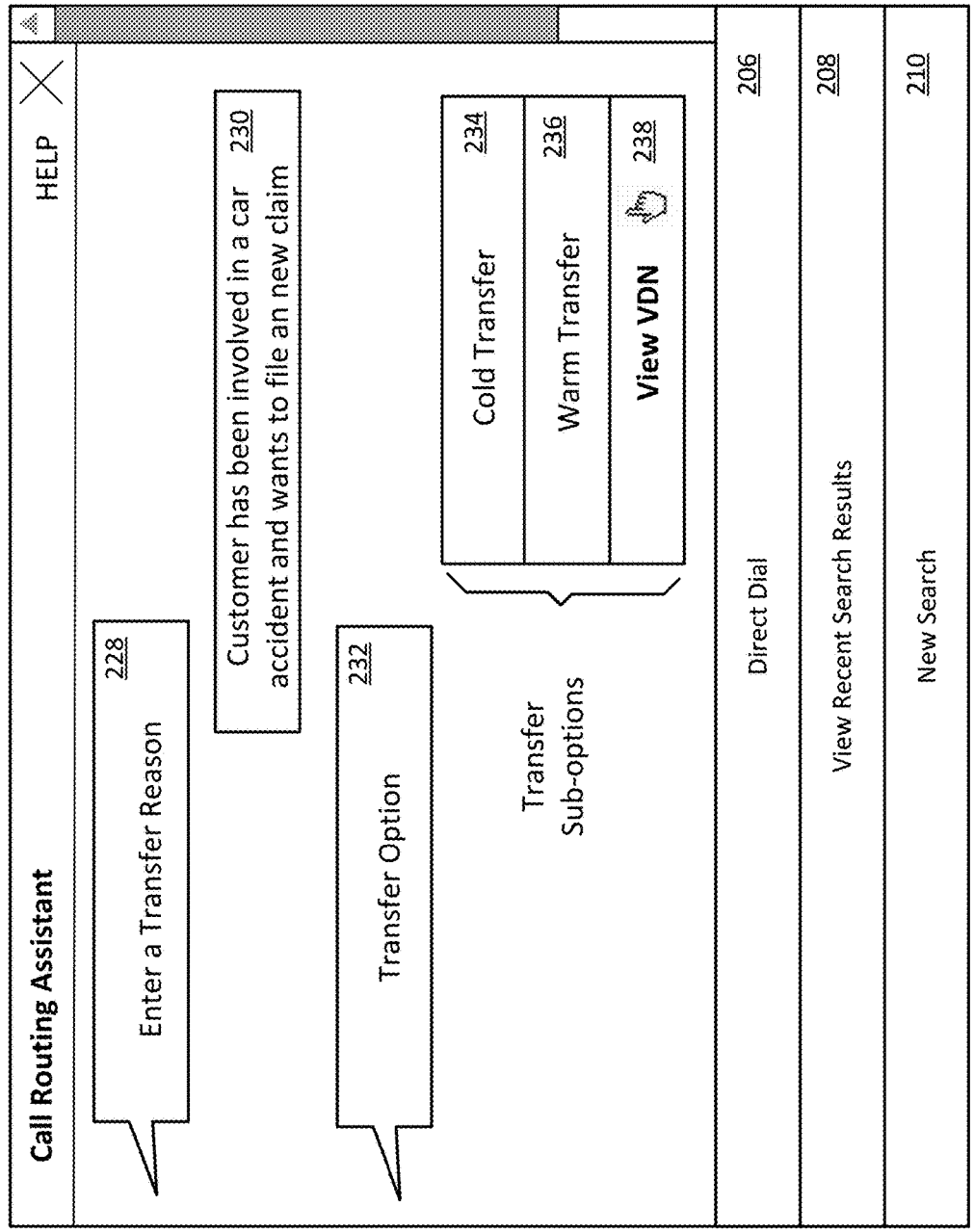

As shown in FIG. 2F, the application 200 may optionally ask the agent to enter a reason for the call transfer (228), and the agent may answer the question by typing in the answer box 230. For example, the agent may enter "Customer has been involved in a car accident and wants to file a new claim." By entering a transfer reason, the agent can help the next agent who handles the transferred call to quickly understand the context of previous communication between the customer and the agent.

After asking all questions, the application 200 can generate a final search result (i.e., a transfer option 232) with different transfer sub-options. The transfer option identifies the correct department that the call should be transferred to and each of the sub-options identify a method for transferring the call to the department. For example, the transfer option identifies a Personal Injury Protection (PIP) unit at an Auto Insurance department. The PIP unit handles inquiries and requests related to filing a new claim that involves personal injuries.

The different transfer sub-options may include a Cold Transfer sub-option 234, a Warm Transfer sub-option 236, or a sub-option to View VDN (238) of the identified department or unit.

If the agent 122 selects the Warm Transfer sub-option 236, the identified department/unit will be called, but before the customer 118 is connected to the identified unit, the original agent 122 will speak to the agent 128 in the identified department/unit to validate that it is really the correct unit to handle the customer 118's need and to provide context about the customer 118's call.

If the agent 122 selects the Cold Transfer sub-option 234, the customer 118's call is transferred directly to the identified department/unit without the original agent 122 speaking to the agent 128 at the identified department unit.

Figure 3:
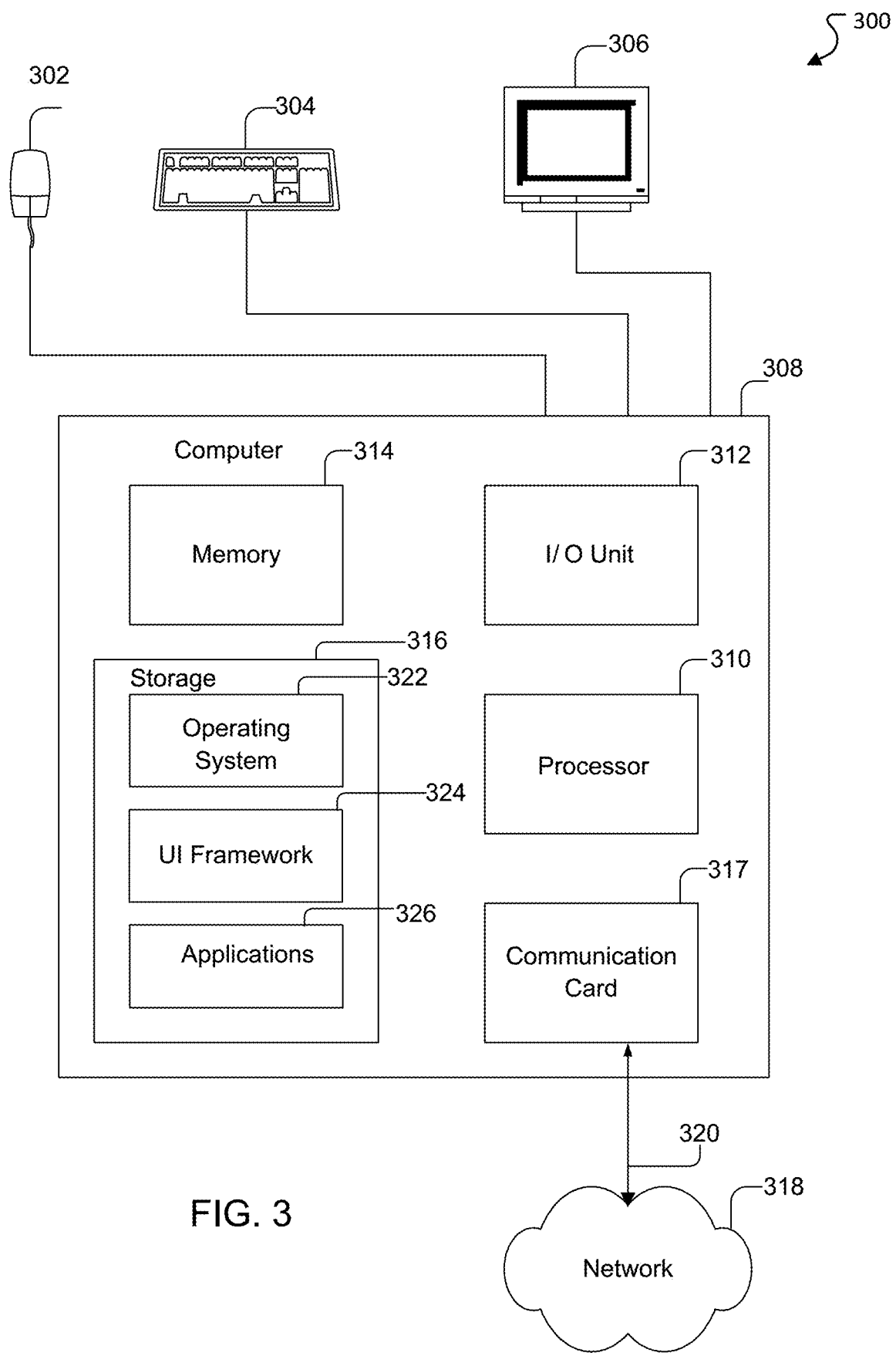
FIG. 3 illustrates an example architecture of a computing system suitable for implementing a call routing assistant system.

If the agent 122 selects the View VDN sub-option 238, the application 200 will display details about the identified department/unit. This option both allows the agent 122 to have confidence that the identified department/unit seems to be the correct one as well as help the agent 122 learn what the correct FIG. 3 illustrates an example of an architecture of a computing system 300 suitable for implementing the call routing assistant system 104 of FIG. 1. The computing system 300 includes input/output (I/O) devices, such as mouse 302, keyboard 304, and display 306, and a central processing unit (CPU) 308. CPU 308 includes a processor 310, an I/O unit 312, memory 314, storage 316, and communications card 317 (e.g., a modem or a network adapter) for exchanging data with a network 318 via a communications link 320 (e.g., a telephone line, a wireless network link, or a cable network). The network 318 can be provided by an internal network service available within an organization. Alternatively, or additionally, the network 318 can include an external network(s) that is available via the Internet or other networked services (e.g., a cloud computing service, a data center, or other remotely accessible medium outside of an organization's internal network). System 300 may be implemented as, for example, a personal computer, a workstation, a server, a cellular telephone, or a personal digital assistant.

Storage 316 stores data and various programs such as an operating system (OS) 322. The OS 322 is a program that controls the functionality and interaction of the hardware components of the computing system 300 and that facilitates the operation of other programs executing on the CPU 208. Windows Me, Windows XP, Linux, and MacOS are examples of common operating systems for personal computers. Windows CE or Windows Embedded are examples of common embedded operating systems used in cellular telephones or personal digital assistants. Examples of programs include the machine learning model 106, the sentiment detector 134, and the call routing assistant application 132 of FIG. 1.

Storage 316 also stores a UI framework 324 and applications 326. The UI framework 324 is a collection of code that implements user interfaces and associated logic for applications 326 running on the CPU 308. For example, the UI framework can be used to generate an application or a website through which the agent 122 interacts with the call routing assistant system 104 (e.g., the agent 122 may search for an appropriate department along with different call transfer options through the user interface). An example of the user interface is illustrated in FIGS. 2A-2F.

In general, the UI framework 324 resides between the applications 326 and the OS 322. In other words, applications 326 interact with the UI framework 324 to initiate UI functions, and then the UI framework 324 calls routines of the OS 322 to implement the initiated UI functions. A user of the computing system 300 may interact with applications 326 running on the CPU 308 through UIs by using I/O devices such as, for example, mouse 302, keyboard 304, and display 306.

The computing system 300 of FIG. 3 is merely one example of a computing system for implementing the systems, methods, and techniques described herein. Other computing systems may be used to implement these systems, methods, and techniques.

Figure 4:
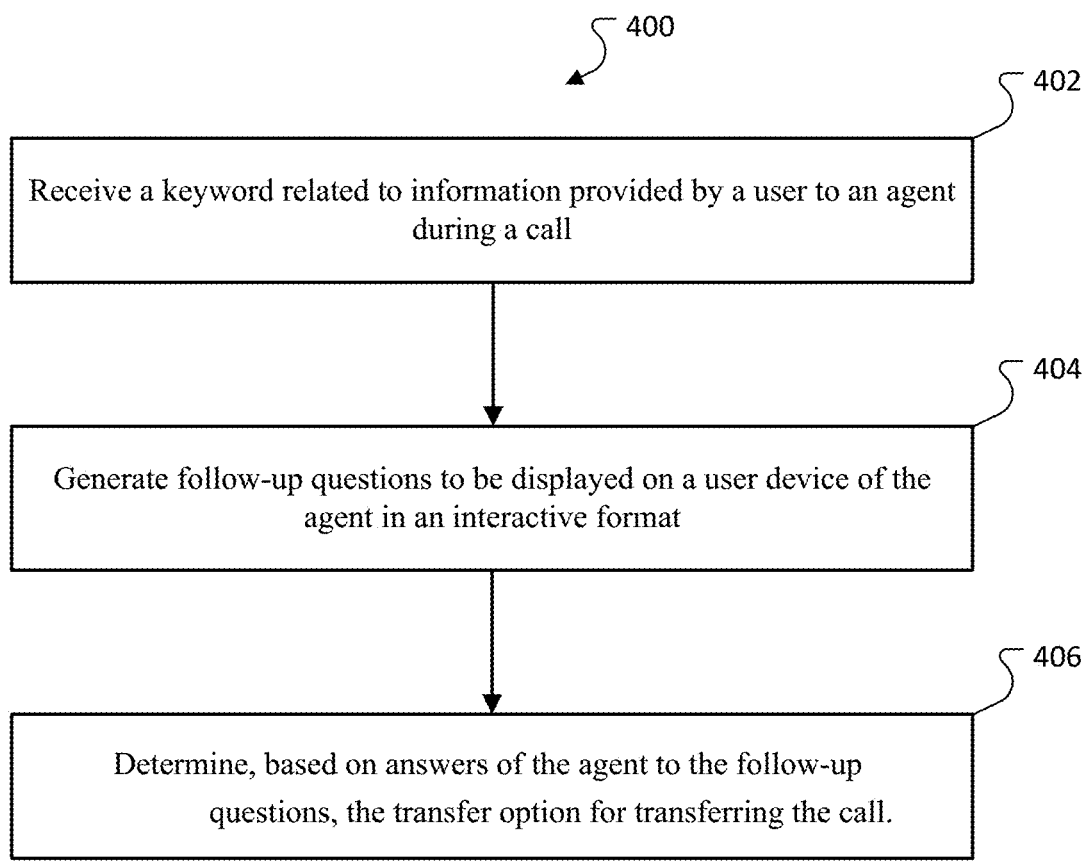
FIG. 4 illustrates a flowchart of an exemplary process for determining a transfer option for transferring a call.

FIG. 4 illustrates a flowchart of an exemplary process 400 for providing a transfer option for transferring a call. For convenience, the process 400 will be described as being performed by a system of one or more computers located in one or more locations. For example, a call routing assistant system (e.g., the call routing assistant system 104 of FIG. 1), appropriately programmed, can perform the process.

The system receives a keyword related to information provided by a user to an agent during a call (step 402). In some implementations, the system may receive the keyword from a speech recognition subsystem that is configured to extract keywords from the information provided by the user to the agent during the call. For example, the speech recognition subsystem is configured to extract keywords using a machine learning model. In some other implementations, the system receives the keyword from the user device of the agent.

The system generates follow-up questions to be displayed on a user device of the agent in an interactive format (step 404). In particular, the system generates the first follow-up question based on the received keyword and generates each of the following follow-up questions based on an answer of the agent to the previous question. The system sequentially displays the follow-up questions on a user interface of the user device. The system displays each of the follow-up questions on the user interface of the user device in response to an answer by the agent to a question preceding the follow up question.

The system determines, based on answers of the agent to the follow-up questions, a transfer option for transferring the call (step 406). The agent may be employed by an organization and the transfer option may identify a department at the organization where the call should be transferred to. The system may display, on a user interface of the user device, multiple sub-options for transferring the call to the identified department. The multiple sub-options may include a cold transfer sub-option and a warm transfer sub-option. The multiple sub-options may also include a sub-option to view a Vector Directory Number associated with the identified department.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
receiving, by a call assistant engine, one or more sequences of speech by a first user during a first call with a first agent;
determining, by the call assistant engine, that the one or more sequences of speech represent a negative sentiment of the first user;
responsive to determining that the one or more sequences of speech represent a negative sentiment of the first user, displaying an alert to a user device of the first agent regarding the negative sentiment during the first call;
determining, by the call assistant engine, based on the one or more sequence of speech, a keyword related to information provided by the first user to the first agent during the first call,
generating, by the call assistant engine, follow-up questions to be displayed on the user device of the first agent in an interactive format, the first follow-up question being generated based on the keyword, each of the following follow-up questions being generated based on an answer of the first agent to the previous question, wherein each of the follow-up questions is generated using a machine learning model,
wherein the machine learning model is trained based on training data regarding a plurality of additional calls between a plurality of additional users and a plurality of additional agents, and
wherein the training data comprises, for each of the additional calls:
one or more input search terms, keywords, or answers collected by the call assistant engine during the additional call, and
a ground-truth output comprising:
one or more output questions generated by the call assistant engine during the additional call, and an indication that the additional call was routed accurately by the call assistant engine to a first transfer option selected by the call assistant engine from among a plurality of candidate transfer options based on the one or more input search terms, keywords, or answers and the one or more output questions, and wherein the machine learning model is trained to generate each of the follow-up questions by minimizing a loss function representing a discrepancy between an output of the machine learning model and the ground-truth output; and determining, by the call assistant engine, based on answers of the first agent to the follow-up questions, a second transfer option for transferring the first call.

2. The method of claim 1, wherein determining the keyword includes receiving the keyword from a speech recognition subsystem configured to extract keywords from the information provided by the first user to the first agent during the first call.

3. The method of claim 2, wherein the speech recognition subsystem is configured to extract keywords using the machine learning model.

4. The method of claim 1, wherein determining the keyword includes receiving the keyword from the user device of the first agent.

5. The method of claim 1, wherein generating the follow-up questions includes sequentially displaying the follow-up questions on a user interface of the user device of the first agent.

6. The method of claim 5, wherein each of the follow-up questions is displayed on the user interface of the user device of the first agent in response to an answer by the first agent to a question preceding the follow up question.

7. The method of claim 1, wherein the first agent is employed by an organization and the second transfer option identifies a department at the organization to which the first call should be transferred.

8. The method of claim 7, further comprising:
displaying, on a user interface of the user device of the first agent, a plurality of sub-options for transferring the first call to the identified department, the plurality of sub-options including a cold transfer sub-option and a warm transfer sub-option.

9. The method of claim 8, wherein the plurality of sub-options includes a sub-option to view a Vector Directory Number associated with the identified department.

10. The method of claim 1, wherein the interactive format comprises a chat interface, the chat interface comprising:
a sequence of graphical elements aligned along a first side of the chat interface, wherein each of the graphical elements represents a corresponding one of the follow-up questions, and
for each of the follow-up questions, a corresponding input element aligned along a second side of the chat interface opposite the first side, wherein each of the input elements comprises a plurality of options for answering a corresponding one of the follow-questions, and wherein at least one of the input elements is positioned between two of the graphical elements in the sequence.

11. A system comprising:
at least one computer; and
a computer-readable medium coupled to the at least one computer having instructions stored thereon which, when executed by the at least one computer, cause the at least one computer to perform operations comprising;
receiving one or more sequences of speech by a first user during a first call with a first agent;
determining that the one or more sequences of speech represent a negative sentiment of the first user;
responsive to determining that the one or more sequences of speech represent a negative sentiment of the first user, displaying an alert to a user device of the first agent regarding the negative sentiment during the first call;
determining a keyword related to information provided by the first user to the first agent during first call;
generating follow-up questions to be displayed on the user device of the first agent in an interactive format, the first follow-up question being generated based on the keyword, each of the following follow-up questions being generated based on an answer of the first agent to the previous question,
wherein each of the follow-up questions is generated using a machine learning model,
wherein the machine learning model is trained based on training data regarding a plurality of additional calls between a plurality of additional users and a plurality of additional agents, and
wherein the training data comprises, for each of the additional calls:
one or more input search terms, keywords, or answers collected by the call assistant engine during the additional call, and
a ground-truth output comprising:
one or more output questions generated by the call assistant engine during the additional call, and
an indication that the additional call was routed accurately by the call assistant engine to a first transfer option selected by the call assistant engine from among a plurality of candidate transfer options based on the one or more input search terms, keywords, or answers and the one or more output questions, and
wherein the machine learning model is trained to generate each of the follow-up questions by minimizing a loss function representing a discrepancy between an output of the machine learning model and the ground-truth output; and
determining, based on answers of the first agent to the follow-up questions, a second transfer option for transferring the first call.

12. The system of claim 11, wherein determining the keyword includes receiving the keyword from a speech recognition subsystem configured to extract keywords from the information provided by the first user to the first agent during the first call.

13. The system of claim 12, wherein the speech recognition subsystem is configured to extract keywords using the machine learning model.

14. The system of claim 11, wherein determining the keyword includes receiving the keyword from the user device of the first agent.

15. The system of claim 11, wherein generating the follow-up questions includes sequentially displaying the follow-up questions on a user interface of the user device of the first agent.

16. The system of claim 15, wherein each of the follow-up questions is displayed on the user interface of the user device of the first agent in response to an answer by the first agent to a question preceding the follow up question.

17. A non-transitory computer storage medium encoded with computer program instructions that when executed by one or more computers cause the one or more computers to perform operations comprising:
- receiving one or more sequences of speech by a first user during a first call with a first agent;
- determining that the one or more sequences of speech represent a negative sentiment of the first user;
- responsive to determining that the one or more sequences of speech represent a negative sentiment of the first user, displaying an alert to a user device of the first agent regarding the negative sentiment during the first call;
- determining, based on the one or more sequence of speech, a keyword related to information provided by the first user to the first agent during the first call;
- generating follow-up questions to be displayed on the user device of the first agent in an interactive format, the first follow-up question being generated based on the keyword, each of the following follow-up questions being generated based on an answer of the first agent to the previous question,
  - wherein each of the follow-up questions is generated using a machine learning model,
  - wherein the machine learning model is trained based on training data regarding a plurality of additional calls between a plurality of additional users and a plurality of additional agents, and
  - wherein the training data comprises, for each of the additional calls:
    - one or more input search terms, keywords, or answers collected by the call assistant engine during the additional call, and
    - a ground-truth output comprising:
      - one or more output questions generated by the call assistant engine during the additional call, and
      - an indication that the additional call was routed accurately by the call assistant engine to a first transfer option selected by the call assistant engine from among a plurality of candidate transfer options based on the one or more input search terms, keywords, or answers and the one or more output questions, and
  - wherein the machine learning model is trained to generate each of the follow-up questions by minimizing a loss function representing a discrepancy between an output of the machine learning model and the ground-truth output; and
- determining, based on answers of the first agent to the follow-up questions, a second transfer option for transferring the first call.

18. The non-transitory computer storage medium of claim 17, wherein determining the keyword includes receiving the keyword from a speech recognition subsystem configured to extract keywords from the information provided by the first user to the first agent during the first call.

19. The non-transitory computer storage medium of claim 17, wherein the first agent is employed by an organization and the second transfer option identifies a department at the organization where the first call should be transferred to.

20. The non-transitory computer storage medium of claim 17, wherein the operations further comprise:
- displaying, on a user interface of the user device of the first agent, a plurality of sub-options for transferring the first call to the identified department, the plurality of sub-options including a cold transfer sub-option and a warm transfer sub-option.

21. The non-transitory computer storage medium of claim 20, wherein the plurality of sub-options includes a sub-option to view a Vector Directory Number associated with the identified department.

* * * * *